Patented May 30, 1950

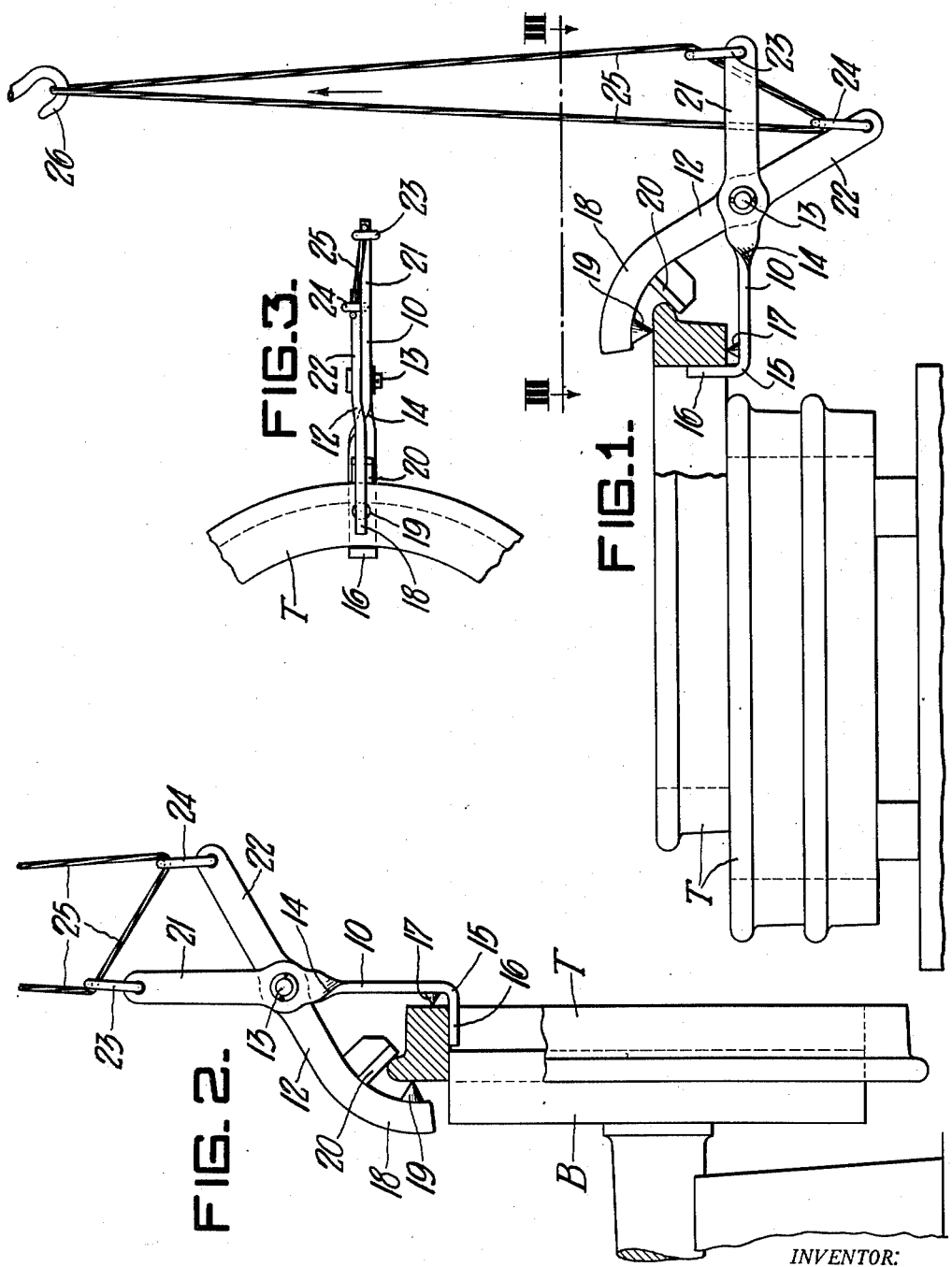

2,509,484

UNITED STATES PATENT OFFICE 2,509,484

LOCOMOTIVE TIRE TONGS

James P. Curley, Pittsburgh, Pa.

Application August 30, 1949, Serial No. 113,115

5 Claims. (Cl. 294—106)

This invention relates to tongs for handling locomotive tires, particularly for transferring such tires from a heating bed to wheel bodies.

Locomotive tires commonly have a shrink fit on their wheel bodies; consequently, before such tires are installed, they must be heated to a temperature at which their thermal expansion enables them to be slipped over the body. Transfer of tires from the heating bed to a wheel body is awkward and previous practices with which I am familiar have required several distinct handling operations and also have been hazardous to workmen.

An object of the present invention is to provide improved tongs which are capable of transferring a locomotive tire from a heating bed to a wheel body in a single operation and which eliminate the hazards of previous practices.

A further object of the invention is to provide improved locomotive tire tongs which are adapted to engage a tire that lies flat in a heating bed and to carry the tire into a upright position and partially slip it over a wheel body.

In accomplishing these and other objects of the invention, I have provided improved details of structure a preferred form of which is shown in the accompanying drawing, in which:

Figure 1 is a side elevational view which shows improved tongs embodying features of the present invention engaged with a locomotive tire for lifting it from a heating bed;

Figure 2 is a side elevational view which shows the tongs slipping the tire over a wheel body; and Figure 3 is a horizontal sectional view taken substantially on the line III—III of Figure 1.

Figure 1 shows a stack of locomotive tires T which lie flat in a heating bed with their flanged edges uppermost. These tires are heated sufficiently that their thermal expansion enables them to be slipped over wheel bodies. Figure 2 shows a wheel body B which is upright and in its normal running position.

The tire tongs of the present invention comprises first and second tong arms 10 and 12, respectively, which are pivoted together scissors fashion on a pin 13. The main portion of tong arm 10 has a 90° twist. Endwise of the twist tong arm 10 has a right angle bend 15. The end segment 16 beyond said bend extends inwardly toward tong arm 12 and is adapted to engage the inner circumference of a tire T. Adjacent said bend the main portion of tong arm 10 carries a bit 17 which is relatively sharp and also is directed inwardly toward tong arm 12. The bit can be welded to the arm or threadedly secured thereto to enable it to be removed and replaced when worn. The main portion of tong arm 12 has a segment 18 which curves inwardly toward tong arm 10. Adjacent its extremity tong arm 12 carries a bit 19 which is directed inwardly and is similar to bit 17 already described. Between said bit and the pivotal connection tong arm 12 carries a heel 20 which preferably is welded thereto.

Tong arms 10 and 12 have integral lever portions 21 and 22, respectively, lever portion 21 being somewhat longer than lever portion 22. The extremities of these lever portions are apertured and carry chain links 23 and 24, respectively. A cable 25 passes through said links and is carried by a hook 26 of an operating crane.

Before the tongs of the present invention are applied to a tire, the top tire in the stack is displaced sidewise from the other tires (Figure 1). Tong arm 10 is then placed under the edge of this top tire, in which position bit 17 engages the lower face of the tire, and segment 16 the inner circumferential face. Tong arm 12 is placed over this tire, in which position bit 19 engages the top face of the tire, and heel 20 the edge of the flange. Tong arm 10 is substantially horizontal and tong arm 12 inclined at an angle of about 30° from the vertical. Figure 1 fully illustrates this relation.

The operating crane is raised and thus lifts the top tire from the stack. This tire swings into an upright position and the crane carries it to wheel body B where it is slipped over said body. Segment 16 terminates somewhat short of the thickness of the tire and thus does not interfere with the tire's being slipped part way over the wheel body. Figure 2 fully illustrates this relation. Next the tongs are removed from the tire and the latter is driven into its final position as known in the art.

From the foregoing description it is seen that I have provided improved locomotive tire tongs of simple and rugged construction and which greatly facilitate transferring such tires to wheel bodies.

While I have shown and described only a single embodiment of the present invention, it is apparent that modifications may arise. Therefore, I do not wish to be limited by the disclosure as set forth, but only by the scope of the appended claims.

I claim:

1. Tongs for handling locomotive tires comprising tong arms pivotally connected together, one of said tong arms having a segment bent to engage the inner circumferential face of a tire and a bit to engage an adjacent side face, the other of said tong arms having a bit to engage the opposite side face and a heel to engage the tire flange, and means for suspending said tong arms from an operating crane.

2. Tongs for handling locomotive tires comprising a pair of tong arms pivotally connected together scissors fashion, one of said tong arms having a segment bent at right angles to engage the inner circumferential face of a tire and a bit to engage an adjacent side face, the other of said tong arms having a bit to engage the opposite side face and a heel to engage the tire flange, said tong arms having lever portions extending from their pivotal connection, and means on said lever portions for suspending the tongs from an operating crane.

3. Tongs for handling locomotive tires comprising first and second tong arms pivotally connected together, said first tong arm having a segment at its extremity bent at a right angle to the main portion of the arm and extending inwardly toward said second tong arm and adapted to engage the inner circumference of a locomotive tire, a bit fixed to said first tong arm adjacent said segment and extending inwardly toward said second tong arm and adapted to engage a face of a locomotive tire, said second tong arm having a region curving toward said first tong arm, a bit fixed to said second tong arm adjacent its extremity and extending inwardly toward said first tong arm and adapted to engage the face of the tire opposite said first named bit, a heel fixed to said second tong arm between said second named bit and the pivotal connection and extending inwardly toward said first tong arm and adapted to engage the flange of a tire, said tong arms having lever portions beyond their pivotal connection, and means on said lever portions for connecting the tongs to an operating crane.

4. Tongs for handling locomotive tires comprising first and second tong arms pivotally connected together, said first tong arm having a substantially 90° twist and an end segment bent at a right angle to the main portion and extending inwardly toward said second tong arm and adapted to engage the inner circumference of a locomotive tire, a relatively sharp bit fixed to said first tong arm adjacent said segment and extending inwardly toward said second tong arm and adapted to engage a face of a locomotive tire, said second tong arm having a region curving toward said first tong arm, a relatively sharp bit fixed to said second tong arm adjacent its extremity and extending inwardly toward said first tong arm and adapted to engage the face of the tire opposite said first named bit, a heel fixed to said second tong arm between said second named bit and the pivotal connection and extending inwardly toward said first tong arm and adapted to engage the flange of a tire, said tong arms having integral lever portions beyond their pivotal connection, and links attached to the extremities of said lever portions for connecting the tongs to an operating crane.

5. Tongs for handling locomotive tires and transferring them from a flat position with their flanges uppermost in a heating bed to an upright position on a wheel body, comprising first and second tong arms pivotally connected together, said first tong arm having a substantially 90° twist and an end segment bent at a right angle to the main portion and extending inwardly toward said second tong arm and adapted to engage the inner circumference of a locomotive tire from underneath as the tire lies in a heating bed, a relatively sharp bit fixed to said first tong arm adjacent said segment and extending inwardly toward said second tong arm and adapted to engage the underface of the tire, said second tong arm having a region curving toward said first tong arm, a relatively sharp bit fixed to said second tong arm adjacent its extremity and extending inwardly toward said first tong arm and adapted to engage the upper face of the tire, a heel fixed to said second tong arm between said second named bit and the pivotal connection and extending inwardly toward said first tong arm and adapted to engage the flange of the tire, said tong arms having integral lever portions beyond their pivotal connection, and links attached to the extremities of said lever portions for connecting the tongs to an operating crane.

JAMES P. CURLEY.

REFERENCES CITED

The following references are of record in the file of this patent:

UNITED STATES PATENTS

| Number | Name | Date |
|---|---|---|
| 466,912 | Schofield | Jan. 12, 1892 |
| 1,017,956 | Carter | Feb. 20, 1912 |